(12) United States Patent
Haddy (10) Patent No.: US 11,048,010 B2
(45) Date of Patent: Jun. 29, 2021

(54) REMOVABLE BURIED ASSET LOCATOR ASSEMBLY

(71) Applicant: Alan Haddy, Naples, FL (US)

(72) Inventor: Alan Haddy, Naples, FL (US)

( * ) Notice: Subject to any disclaimer, the term of this patent is extended or adjusted under 35 U.S.C. 154(b) by 213 days.

(21) Appl. No.: 16/259,530

(22) Filed: Jan. 28, 2019

(65) Prior Publication Data

US 2020/0241161 A1 Jul. 30, 2020

(51) Int. Cl.
*B05B 12/00* (2018.01)
*G01V 3/165* (2006.01)
*G01V 3/08* (2006.01)
*G01S 19/13* (2010.01)

(52) U.S. Cl.
CPC ............ *G01V 3/165* (2013.01); *B05B 12/002* (2013.01); *G01S 19/13* (2013.01); *G01V 3/08* (2013.01)

(58) Field of Classification Search
CPC .... B65D 83/203; B65D 83/36; B65D 83/208; B65D 2203/10; B65D 83/202; B65D 83/38; B65D 83/75; B65D 83/20; G01C 15/06; G01C 15/02; G01C 15/04; G01C 3/08; B05B 12/004
See application file for complete search history.

(56) References Cited

U.S. PATENT DOCUMENTS

| | | | | |
|---|---|---|---|---|
| 5,287,998 A * | 2/1994 | Smrt | ................... | B65D 83/208 |
| | | | | 222/402.1 |
| 6,294,022 B1 * | 9/2001 | Eslambolchi | ........ | B65D 83/203 |
| | | | | 118/315 |
| 9,527,655 B2 * | 12/2016 | Kaufman | ............. | B65D 83/205 |
| 10,105,723 B1 * | 10/2018 | Olsson | ................. | B05B 12/002 |
| 10,569,951 B2 * | 2/2020 | Olsson | ................... | B05B 12/00 |

* cited by examiner

*Primary Examiner* — Alesa Allgood
(74) *Attorney, Agent, or Firm* — Mark Terry (57) ABSTRACT

An electromagnetic locate device configured for removable attachment to a handheld paint marking device includes an elongated element extending substantially a length of the handheld paint marking device, a channel extending longitudinally along the elongated element, the channel configured for accepting at least a portion of the handheld paint marking device, fasteners located on the elongated element, the fasteners configured to fasten the handheld paint marking device to the elongated element, electromagnetic antennas located along a length of the elongated element, the electromagnetic antennas configured for producing electromagnetic data responsive to an electromagnetic field emanating from a buried asset, and a housing coupled to a top of the elongated element, the housing including a processor communicably coupled to the electromagnetic antennas and configured to process the electromagnetic data from the electromagnetic antennas, so as to produce buried asset data, and a display for displaying said buried asset data.

11 Claims, 6 Drawing Sheets

REMOVABLE BURIED ASSET LOCATOR ASSEMBLY

CROSS-REFERENCE TO RELATED APPLICATIONS

Not applicable.

TECHNICAL FIELD

The technical field relates generally to the detection and identification of buried assets (i.e., underground utility lines) and more specifically to devices used for detecting and identifying buried assets.

TECHNICAL FIELD

The technical field relates generally to the detection and identification of buried assets (i.e., underground utility lines) and for quality control and quality assurance in buried asset location procedures.

BACKGROUND

Utility lines, such as lines for telephones, electricity distribution, natural gas, cable television, fiber optics, Internet, traffic lights, street lights, storm drains, water mains, and wastewater pipes, are often located underground. Said utility lines described above are referred to as "buried assets" herein. Consequently, before excavation occurs in an area, especially an urban area, an excavator is typically required to clear excavation activities with the proper authorities and service providers. The clearance procedure usually requires that the excavator contact a central authority (such as "One Call", "811" and "Call Before You Dig," which are well known in the art) which, in turn, sends a notification to the appropriate utility companies. Subsequently, each utility company must perform a buried asset detection procedure, which includes having a field technician visit the proposed excavation site, detecting the relevant buried assets and physically marking the position of the buried asset using temporary paint or flags.

Usually, a field technician visiting a proposed excavation site utilizes a portable electronic device known as a pipe or cable locator, an electromagnetic locate device ("ELD"), an electromagnetic locator, a buried asset locate device, or a buried asset locator (collectively referred to herein as an "ELD"). Said ELDs are commercial, off-the-shelf, devices employed to detect and identify the position of buried assets. ELDs are usually used in conjunction with a transmitter, so as to create a field that can be detected by the ELD. This is typically achieved by connecting the transmitter to a suitable connection point (i.e., pedestal, hydrant, manhole, removable cover, lid, junction box or other access point) of the buried asset, wherein the transmitter sends a signal of a specific frequency onto the buried asset. Subsequently, the ELD is "tuned" to the specific frequency in order to locate the resulting electromagnetic signal radiating from the buried asset, thus enabling the position and route of the buried asset to be marked with paint or flags above surface. The above noted procedure requires that the technician carry an ELD to detect the buried assets, as well as a separate device for marking the ground with paint or flags, referred to as a handheld paint marking device, a paint stick or a handheld marker wand. This can be unwieldly, complicated and annoying for a technician who may perform a large number of buried asset procedures in a single day.

Therefore, a need exists for improvements over the prior art, and more particularly for more efficient methods and systems for performing buried asset locate procedures.

SUMMARY

An electromagnetic locate device (ELD) configured for removable attachment to a handheld paint marking device is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, the ELD configured for removable attachment to a handheld paint marking device comprises an elongated element extending substantially a length of the handheld paint marking device, a channel extending longitudinally along the elongated element, the channel configured for accepting at least a portion of the handheld paint marking device, one or more fasteners located on the elongated element, the one or more fasteners configured to fasten the handheld paint marking device to the elongated element; one or more electromagnetic antennas located along a length of the elongated element, the electromagnetic antennas configured for producing electromagnetic data responsive to an electromagnetic field emanating from a buried asset, and a housing coupled to a top of the elongated element, the housing including a processor communicably coupled to the one or more electromagnetic antennas and configured to process the electromagnetic data from the one or more electromagnetic antennas, so as to produce buried asset data, and a display for displaying said buried asset data.

In another embodiment, a system for detecting buried assets and placing markings on a ground including a handheld paint marking device comprising a handle, a shaft connected to the handle, a receptacle on one end of the shaft for holding a paint can, and a trigger on the handle for activating the paint can. The system also includes an ELD configured for removable attachment to the handheld paint marking device, wherein the ELD includes an elongated element extending substantially a length of the handheld paint marking device, a channel extending longitudinally along the elongated element, the channel configured for accepting at least a portion of the handheld paint marking device, one or more fasteners located on the elongated element, the one or more fasteners configured to fasten the handheld paint marking device to the elongated element; one or more electromagnetic antennas located along a length of the elongated element, the electromagnetic antennas configured for producing electromagnetic data responsive to an electromagnetic field emanating from a buried asset, and a housing coupled to a top of the elongated element, the housing including a processor communicably coupled to the one or more electromagnetic antennas and configured to process the electromagnetic data from the one or more electromagnetic antennas, so as to produce buried asset data, and a display for displaying said buried asset data.

BRIEF DESCRIPTION OF THE DRAWINGS

The accompanying drawings, which are incorporated in and constitute a part of this disclosure, illustrate various example embodiments. In the drawings.

DETAILED DESCRIPTION

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed subject matter improves over the prior art by providing a system that a technician can hold in one hand, wherein the system locates buried assets, and makes paint marks on the ground, using only one hand. In short, the claimed subject matter marries the functionality of an ELD with a handheld paint marker device into a single, user-friendly and wieldy device. The claimed subject matter also provides a more efficient, automated and precise way of performing buried asset locating procedures, and spraying paint on the ground to indicate the placement of buried assets underground. The system 100 allows a field technician to carry the system 100 with his hand extended downward at his side, marrying the buried asset locating functions of the device 150 with the paint marking functions of the device 170. In summary, the resulting system 100 combines all of the following functions: buried asset locating functions and paint marking.

Figure 1:
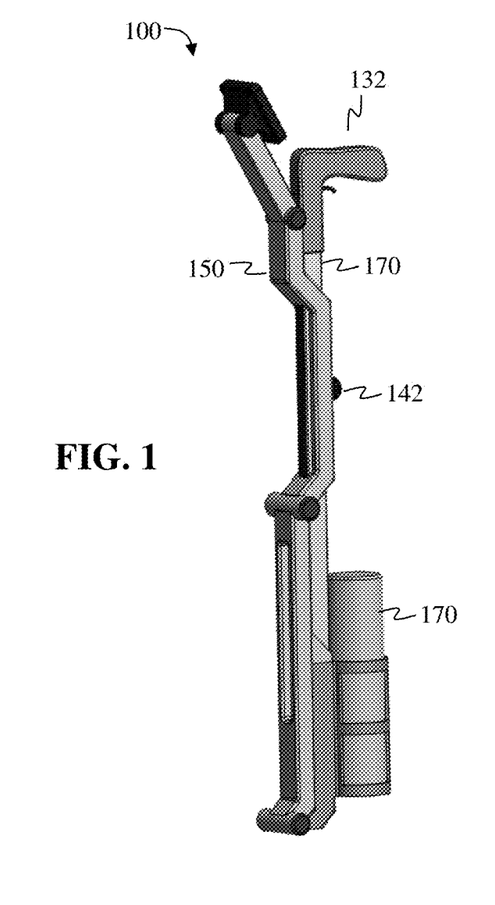
FIG. 1 is an illustration of a left side perspective view of an electromagnetic locate device (ELD) configured for removable attachment to a handheld paint marking device, according to an example embodiment.

FIG. 1 is an illustration of a left side perspective view of an electromagnetic locate device (ELD) 150 configured for removable attachment to a handheld paint marking device 170, according to an example embodiment. The system 100 may be referred to as an assembly, since it consists of an ELD 150, and a handheld paint marking device 170, among other things. FIG. 1 shows that the handheld paint marking device 170 has been fastened to the ELD 150, which together are referred to as a system 100 for detecting buried assets and placing markings on the ground. The handheld paint marking device 170 comprises a handle 132, a shaft 130 connected to the handle, a receptacle 120 on one end of the shaft for holding a paint can 122, and a trigger 134 on the handle for activating the paint can. This arrangement of components allows a technician holding the handheld paint marking device 170 to grasp the handle 132 while keeping the paint can 122 near the ground. When the technician holds the handheld paint marking device 170 over a location on the ground that he intends to mark with paint, he may pull the trigger 134 to expel paint from the can and mark the ground.

Figure 2:
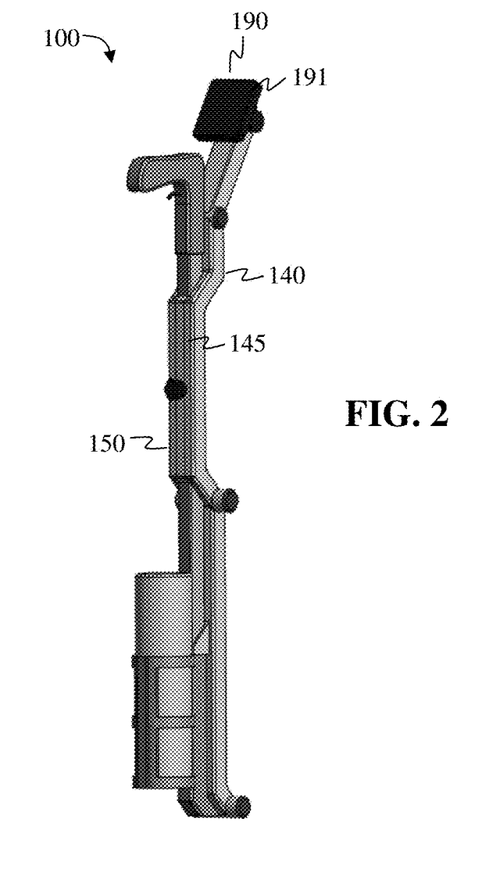
FIG. 2 is an illustration of a right-side perspective view of the ELD configured for removable attachment to a handheld paint marking device, according to an example embodiment.

FIG. 2 is an illustration of a right-side perspective view of the ELD 150 configured for removable attachment to the handheld paint marking device 170, according to an example embodiment. FIG. 2 shows that the ELD 150 comprises an elongated element 140 extending substantially a length of the handheld paint marking device 170. The ELD 150 also includes a channel 145 extending longitudinally along the elongated element, the channel configured for accepting at least a portion of the handheld paint marking device. The ELD 150 also includes one or more fasteners 142 located on the elongated element, the one or more fasteners configured to fasten the handheld paint marking device to the elongated element. The ELD 150 also includes one or more electromagnetic antennas 149 located along a length of the elongated element, the electromagnetic antennas configured for producing electromagnetic data responsive to an electromagnetic field 901 emanating from a buried asset 902.

Figure 3:
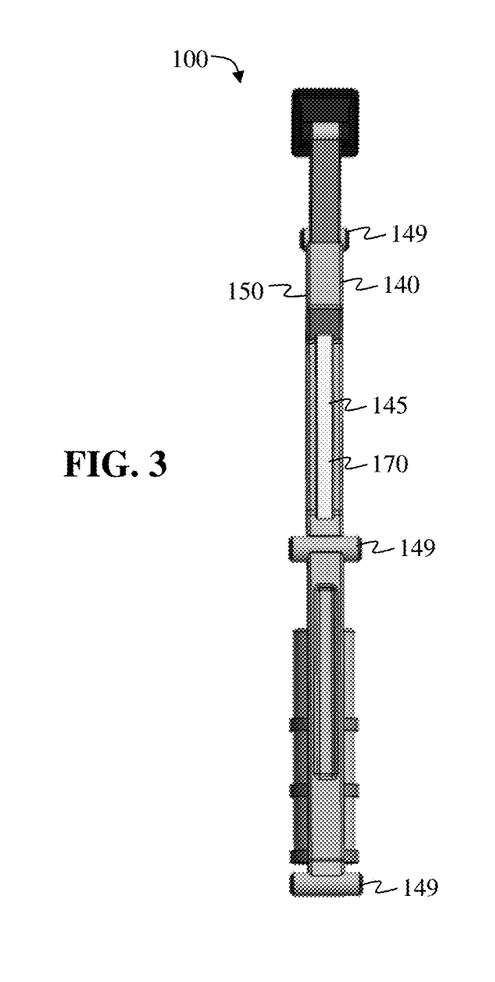
FIG. 3 is an illustration of a rear view of the ELD configured for removable attachment to a handheld paint marking device, according to an example embodiment.

FIG. 3 is an illustration of a rear view of the ELD 150 configured for removable attachment to the handheld paint marking device 170, according to an example embodiment. FIG. 3 shows that the ELD 150 includes a channel 145 extending longitudinally along the elongated element 140, wherein the channel has accepted at least a portion of the shaft 130 of the handheld paint marking device 170. FIG. 3 shows that the channel 145 may comprise two elongated bars that define a channel between them, in which the shaft 130 of the handheld paint marking device 170 is inserted.

Figure 4:
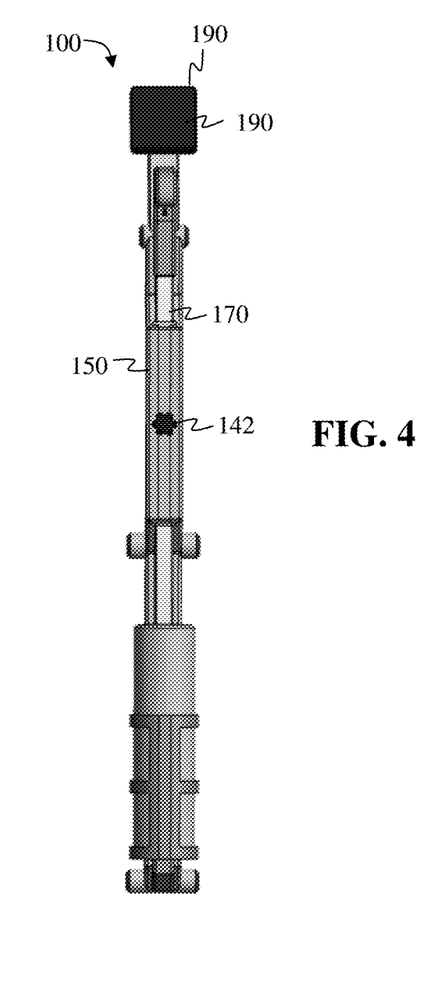
FIG. 4 is an illustration of a front view of the ELD configured for removable attachment to a handheld paint marking device, according to an example embodiment.

FIG. 4 is an illustration of a front view of the ELD 150 configured for removable attachment to the handheld paint marking device 170, according to an example embodiment. FIG. 4 shows that the ELD 150 includes a fastener 142 located on the elongated element 140, wherein the fastener 142 fastens the handheld paint marking device 170 to the elongated element 140.

Figure 5:
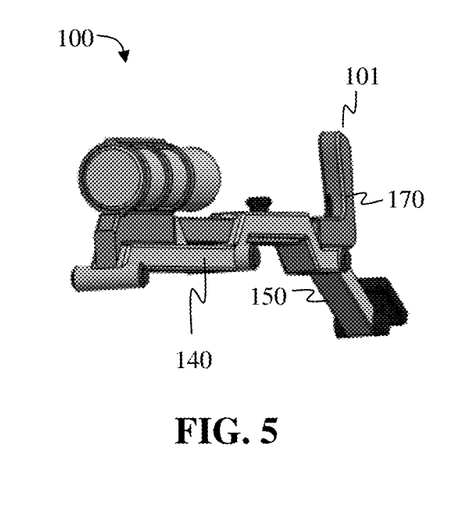
FIG. 5 is an illustration of a bottom perspective view of the ELD configured for removable attachment to a handheld paint marking device, according to an example embodiment.

FIG. 5 is an illustration of a bottom perspective view of the ELD 150 configured for removable attachment to the handheld paint marking device 170, according to an example embodiment. FIG. 5 shows that a portion of the shaft 130 of the handheld paint marking device 170 has been inserted into, and fastened to, channel 145 extending longitudinally along the elongated element 140.

Figure 6:
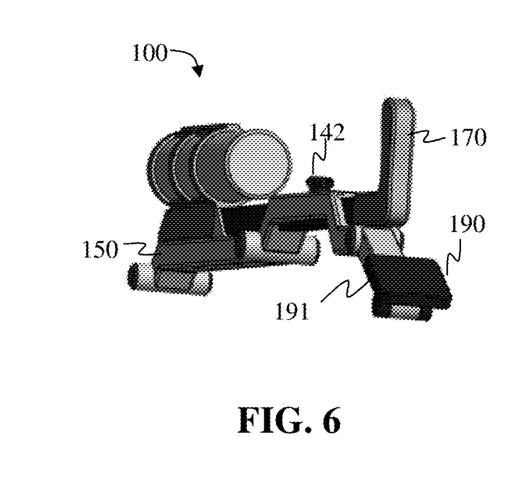
FIG. 6 is an illustration of a right-side perspective view of the ELD configured for removable attachment to a handheld paint marking device, according to an example embodiment.

FIG. 6 is an illustration of a right-side perspective view of the ELD 150 configured for removable attachment to the handheld paint marking device 170, according to an example embodiment. FIG. 6 shows that the ELD 150 includes a housing 190 coupled to a top of the elongated element 140, the housing including a processor communicably coupled to the one or more electromagnetic antennas 149 and configured to process the electromagnetic data from the one or more electromagnetic antennas, so as to produce buried asset data, and a display 191 for displaying said buried asset data. The display 191 may comprise a screen or display, which may be a touchscreen. This display 191 allows the user to view buried asset location data, such as depth, current and buried asset type, as well as issue commands, such as storing buried asset location data.

Figure 7:
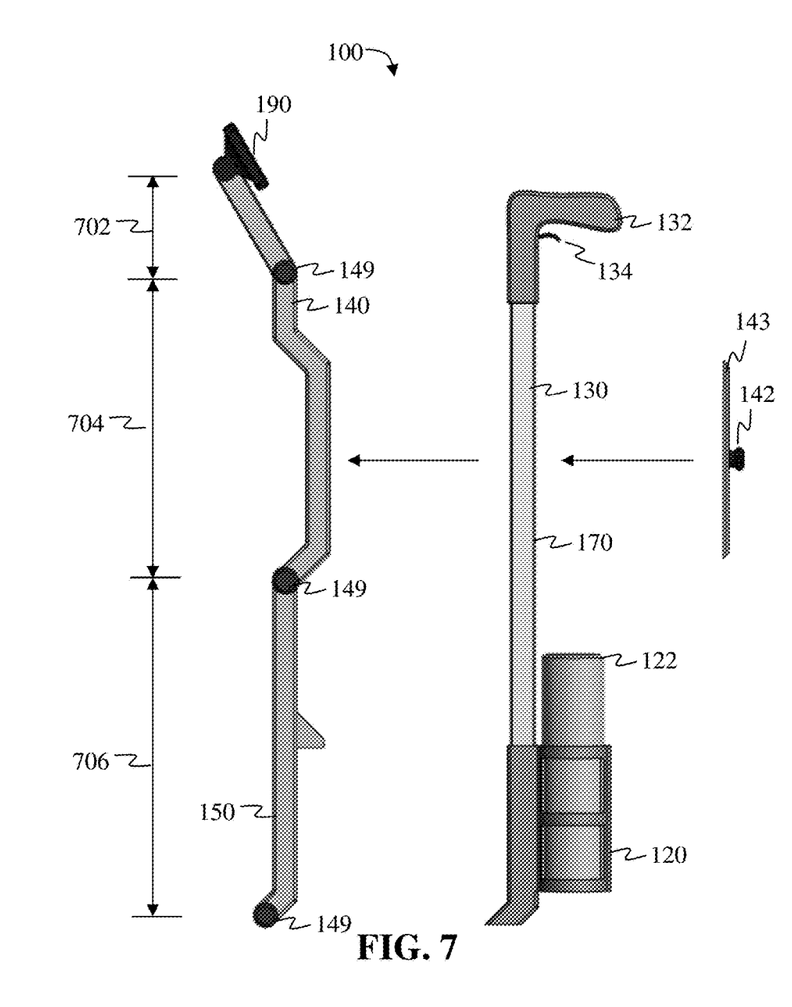
FIG. 7 is an illustration of a left side perspective and exploded view of the ELD configured for removable attachment to a handheld paint marking device, according to an example embodiment.

FIG. 7 is an illustration of a left side perspective and exploded view of the ELD 150 configured for removable attachment to the handheld paint marking device 170, according to an example embodiment. FIG. 7 shows that a portion of the shaft 130 of the handheld paint marking device 170 is being inserted into channel 145 extending longitudinally along the elongated element 140. The fastener 142 is attached to a plate 143. Once the portion of the shaft 130 is inserted into channel 145, the fastener 142 and plate 143 are placed on top of the portion of the shaft 130 and fastened. The fastener 142 and plate 143 secure the shaft 130 in the channel 145.

FIG. 7 also shows that the distance between the first electromagnetic antenna 149 and the second electromagnetic antenna 149 (i.e., distance 704) is known and defined in the system 100. Similarly, the distance between the second electromagnetic antenna 149 and the third electromagnetic antenna 149 (i.e., distance 706) is also known and defined in the system 100. Said defined distances allow the ELD 150 to calculate the distance to the buried asset 902 that is being detected, based on the electromagnetic field 901 emanating from the buried asset. Additionally, the distance between the housing 190 and the first antenna 149 (i.e., distance 702) is known and defined in the system 100, as well as the distance between the housing 190 and the second antenna (i.e., distance 702 plus distance 704) and the distance between the housing 190 and the third antenna (i.e., distance 702 plus distance 704 plus distance 706). Said defined distances between the housing 190 and the antennas allow the ELD 150 to correct the calculations it performs in detecting and locating the buried asset 902, based on the electromagnetic field 901 emanating from the buried asset 902 that is being detected.

Figure 8:
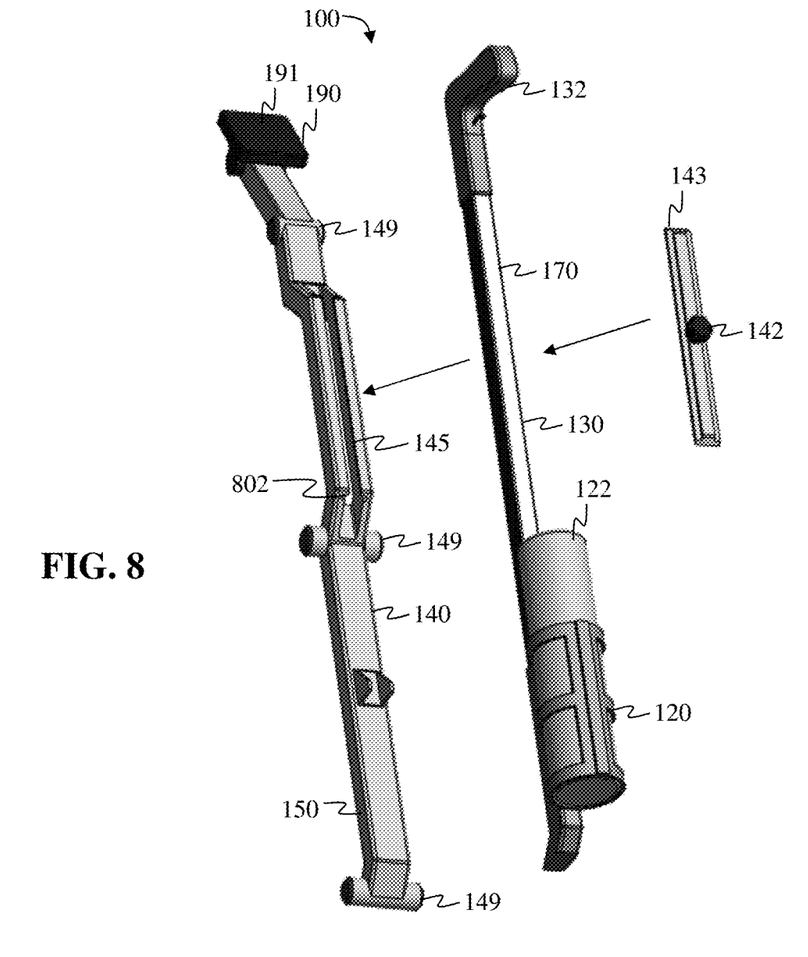
FIG. 8 is another illustration of a left side perspective and exploded view of the ELD configured for removable attachment to a handheld paint marking device, according to an example embodiment.

FIG. 8 is another illustration of a left side perspective and exploded view of the ELD 150 configured for removable attachment to the handheld paint marking device 170, according to an example embodiment. FIG. 8 shows another view of the channel 145 extending longitudinally along the elongated element 140. The channel 145 is sized and shaped to accept the size and shape of a portion of the shaft 130 of the handheld paint marking device 170.

FIG. 8 shows that the channel 145 may comprise two elongated bars that define a channel between them, in which the shaft 130 of the handheld paint marking device 170 is inserted. Included in the inside surface of the said two elongated bards (i.e., the surface that faces the channel 145) are channels or gutters 802. The purpose of channels or gutters 802 is to accept the plate 143. That is, the plate 143 may be inserted in between the two elongated bars, wherein the edges of the plate 143 are inserted into the channels or gutters 802. Subsequently, the fastener 142 (which may be a screw that extends through the plate 143) may be adjusted to secure the plate to the ELD 150.

Figure 9:
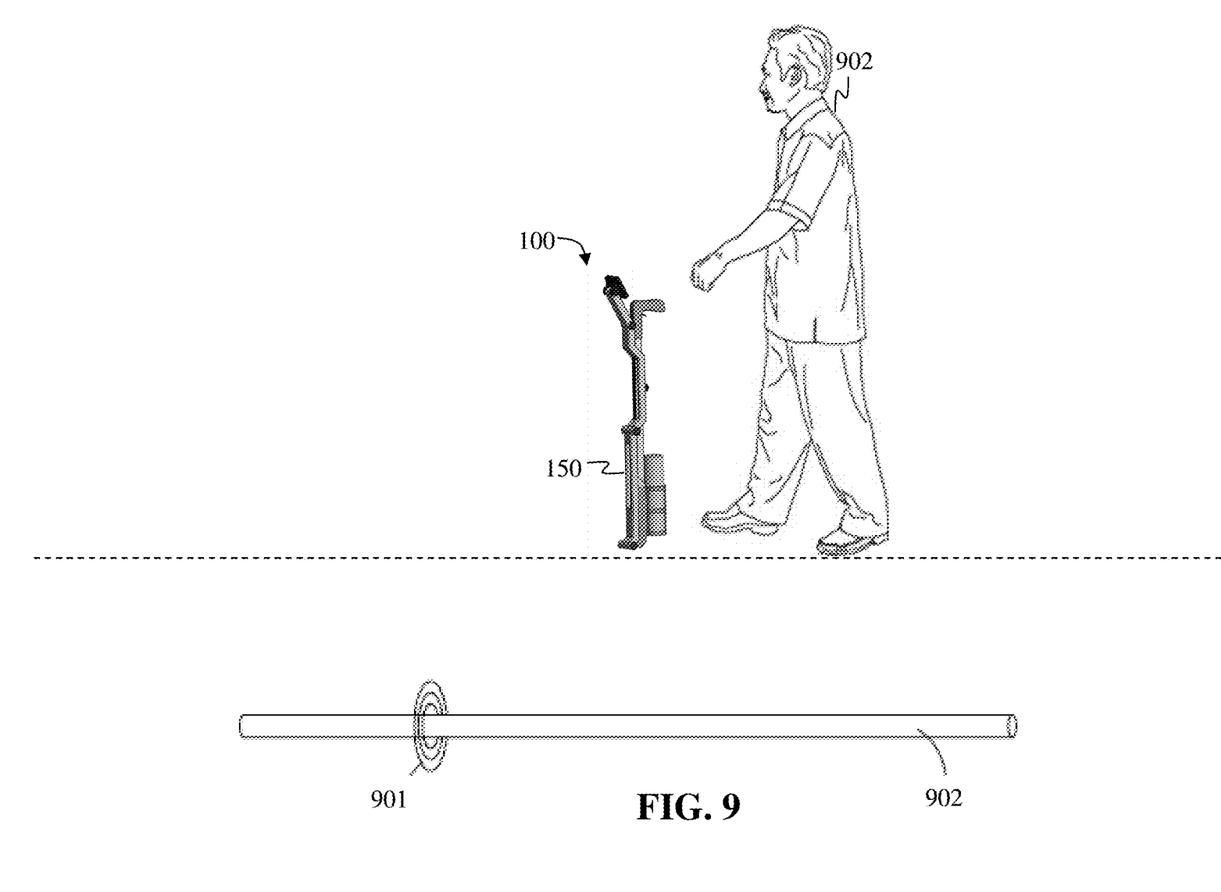
FIG. 9 is an illustration of the ELD configured for removable attachment to a handheld paint marking device while performing buried asset locate procedures during use, according to an example embodiment.

FIG. 9 is an illustration of the ELD 150 configured for removable attachment to the handheld paint marking device 170 while performing buried asset locate procedures during use, according to an example embodiment. FIG. 9 shows a field technician 902 utilizing the system 100 (which comprises the device 150 and the device 170) to perform buried asset locating procedures, and spray paint on the ground to indicate the placement of buried assets underground. The system 100 allows a field technician to carry the system 100 with his right hand extended downward at his side. In this position, since the paint can 122 is near the ground, and the trigger 134 is located at the fingertips of his hand, the field technician 902 may pull the trigger and spray paint on the ground. FIG. 9 shows that the device 150 has been attached to the device 170, which marries the buried asset locating functions of the device 150 with the paint marking functions of the device 170. In summary, the resulting system 100 combines all of the following functions: buried asset locating functions and paint marking.

ELD 150 is outfitted with the components necessary to perform buried asset detection procedures, including at least three electromagnetic antennas, which are configured to sense and report on changes in the electrical and magnetic fields, as is well known in the prior art. Two of the antennas may be configured horizontally while one antenna may be configured vertically.

ELD 150 may also include a processor configured for reading electromagnetic data from the at least three electromagnetic antennas due to a buried asset, processing said electromagnetic data, and generating depth, current and location information about said buried asset based on said electromagnetic data.

ELD 150 may also include a processor that may calculate current geographical position (otherwise referred to as geographical location data). The processor may calculate current position using a satellite or ground based positioning system, such as a Global Positioning System (GPS) system, which is a navigation device that receives satellite or land-based signals for the purpose of determining the device's current geographical position on Earth. ELD 150 may calculate current geographical position (otherwise referred to as geographical location data) using an on-board processor or a connected processor. In one embodiment, ELD 150 may calculate current position using a satellite or ground based positioning system, such as a Global Positioning System (GPS) system, which is a navigation device that receives satellite or land-based signals for the purpose of determining the device's current geographical position on Earth. Generally, ELD 150 calculates global navigation satellite system (GNSS) data. A GNSS or GPS receiver, and its accompanying processor, may calculate latitude, longitude and altitude information. In this document, the terms GNSS and GPS are used generally to refer to any global navigation satellite system, such as GLONASS, GALILEO, GPS, etc. In this embodiment, a radio frequency signal is received from a satellite or ground based transmitter comprising a time the signal was transmitted and a position of the transmitter. Subsequently, ELD 150 calculates current geographical location data of the device based on the signal. In another embodiment, ELD 150 calculates current geographical location using alternative services, such as control plan locating, GSM localization, dead reckoning, or any combination of the aforementioned position services. The term spatial technologies or spatial processes refers generally to any processes and systems for determining one's position using radio signals received from various sources, including satellite sources, land-based sources and the like.

The ELD may collect the following data produced by the device as a result of performance of the buried asset location procedure by the field technician: electromagnetic data from one or more electromagnetic sensors in the system, wherein said electromagnetic data includes current and depth measurements, as well as device gain and full scale deflection data, and wherein said electromagnetic data is produced as a result of movement of the system by the field technician during performance of the buried asset location procedure, a mode of the system, wherein the mode includes a frequency mode of the system, and wherein the mode is set by the field technician during performance of the buried asset location procedure, and position data of the system from a global navigation satellite system receiver in the system.

Electromagnetic data may include electrical current measurement data, resistance measurement data, impedance measurement data, electrical signal magnitude measurement data, electrical signal frequency measurement data, electrical signal voltage measurement data, etc. The electromagnetic data produced by the ELD 150 may be displayed in the display.

A mode may include any one of a variety of modes (that are well-known in the art) in which a locator device may be placed. With regard to mode, each ELD has various modes that the field technician selects depending on type of utility, type of environment, etc. These device mode selections include frequency selections to match transmitter selection, peak signal mode, null signal mode, peak and null signal modes simultaneously, line versus sonde/probe mode. Said device mode selections may define a locate device operating mode. The system may also collect electromagnetic (EM) signal response data, which indicates how the locator device is responding to the electromagnetic signals it is detecting and processing, as well as signal strength, signal direction (left, right of target), system gain control, phase (direction) of signal, measured depth, measured current, etc.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An electromagnetic locate device (ELD) configured for removable attachment to a handheld paint marking device, the ELD comprising:
    an elongated element extending substantially a length of the handheld paint marking device;
    a channel extending longitudinally along the elongated element, the channel configured for accepting at least a portion of the handheld paint marking device, wherein the channel comprises a pair of opposing walls that define the channel along the elongated element;
    one or more fasteners located on the elongated element, the one or more fasteners configured to fasten the handheld paint marking device to the elongated element;
    one or more electromagnetic antennas located along a length of the elongated element, the electromagnetic antennas configured for producing electromagnetic data responsive to an electromagnetic field emanating from a buried asset; and
    a housing coupled to a top of the elongated element, the housing including a processor communicably coupled to the one or more electromagnetic antennas and configured to process the electromagnetic data from the one or more electromagnetic antennas, so as to produce buried asset data, and a display for displaying said buried asset data.

2. The ELD of claim 1, further comprising a global navigation satellite system (GNSS) processor configured for calculating a current global position.

3. The ELD of claim 2, further comprising a battery for powering the ELD.

4. The ELD of claim 3, wherein said buried asset data includes depth, current and location information about said buried asset.

5. The ELD of claim 4, wherein the display is further configured for displaying the depth, current and location information about said buried asset.

6. A system for detecting buried assets and placing markings on a ground, the system comprising:
    a handheld paint marking device comprising a handle, a shaft connected to the handle, a receptacle on one end of the shaft for holding a paint can, and a trigger on the handle for activating the paint can; and
    an electromagnetic locate device (ELD) configured for removable attachment to the handheld paint marking device, the ELD comprising:
        an elongated element extending substantially a length of the handheld paint marking device;
        a channel extending longitudinally along the elongated element, the channel configured for accepting at least a portion of the handheld paint marking device, wherein the channel comprises a pair of opposing walls that define the channel along the elongated element;
        one or more fasteners located on the elongated element, the one or more fasteners configured to fasten the handheld paint marking device to the elongated element;
        one or more electromagnetic antennas located along a length of the elongated element, the electromagnetic antennas configured for producing electromagnetic data responsive to an electromagnetic field emanating from a buried asset; and
        a housing coupled to a top of the elongated element, the housing including a processor communicably coupled to the one or more electromagnetic antennas and configured to process the electromagnetic data from the one or more electromagnetic antennas, so as to produce buried asset data, and a display for displaying said buried asset data.

7. The system of claim 6, the ELD further comprising a global navigation satellite system (GNSS) processor configured for calculating a current global position.

8. The system of claim 7, the ELD further comprising a battery for powering the ELD.

9. The system of claim 8, wherein said buried asset data includes depth, current and location information about said buried asset.

10. The system of claim 9, wherein the display is further configured for displaying the depth, current and location information about said buried asset.

11. The system of claim 9, wherein the processor is further configured for processing the electromagnetic data from the one or more electromagnetic antennas, and correcting said electromagnetic data based on a defined distance between the processor and the one or more electromagnetic antennas, so as to produce buried asset data.

\* \* \* \* \*